United States Patent
Streng et al.

(10) Patent No.: US 7,497,470 B2
(45) Date of Patent: Mar. 3, 2009

(54) ENERGY ABSORBING APPARATUS

(75) Inventors: Joseph R. Streng, Saginaw, MI (US); Melvin L. Tinnin, Clio, MI (US)

(73) Assignee: Delphi Technologies, Inc., Troy, MI (US)

(*) Notice: Subject to any disclaimer, the term of this patent is extended or adjusted under 35 U.S.C. 154(b) by 439 days.

(21) Appl. No.: 11/284,713

(22) Filed: Nov. 21, 2005

(65) Prior Publication Data

US 2007/0113701 A1    May 24, 2007

(51) Int. Cl.
B62D 1/19 (2006.01)
(52) U.S. Cl. .................. 280/777; 188/371; 188/375
(58) Field of Classification Search .......... 280/775, 280/777; 74/493; 188/371, 374–376; B62D 1/19
See application file for complete search history.

(56) References Cited

U.S. PATENT DOCUMENTS

| | | | |
|---|---|---|---|
| 3,877,319 A * | 4/1975 | Cooper | 74/492 |
| 4,616,522 A | 10/1986 | White et al. | |
| 4,643,448 A | 2/1987 | Loren | |
| 4,786,076 A | 11/1988 | Wierschem | |
| 4,838,576 A | 6/1989 | Hamasaki et al. | |
| 5,082,311 A | 1/1992 | Melotik | |
| 5,131,286 A | 7/1992 | Sturges et al. | |
| 5,314,204 A * | 5/1994 | DuRocher et al. | 280/777 |
| 5,413,417 A * | 5/1995 | Labedan | 384/572 |
| 5,476,284 A | 12/1995 | DuRocher et al. | |
| 5,722,300 A * | 3/1998 | Burkhard et al. | 74/493 |
| 5,829,310 A | 11/1998 | DePaolis | |
| 5,870,930 A | 2/1999 | Willett et al. | |
| 5,899,116 A | 5/1999 | Armstrong et al. | |
| 6,026,704 A * | 2/2000 | Shibata et al. | 74/496 |
| 6,062,100 A | 5/2000 | Sarsfield et al. | |
| 6,148,687 A | 11/2000 | Kurita | |
| 6,176,151 B1 | 1/2001 | Cymbal | |
| 6,389,923 B1 * | 5/2002 | Barton et al. | 74/492 |
| 6,460,888 B1 | 10/2002 | Hoagland | |
| 6,726,248 B2 | 4/2004 | Satou et al. | |
| 6,848,334 B2 | 2/2005 | Kluemper et al. | |
| 6,892,602 B2 * | 5/2005 | Hirschfeld et al. | 74/484 R |
| 6,935,657 B2 | 8/2005 | Kondou et al. | |
| 7,168,741 B2 * | 1/2007 | Kinme et al. | 280/777 |
| 7,185,918 B2 * | 3/2007 | Riefe et al. | 280/777 |
| 2005/0029794 A1 * | 2/2005 | Riefe et al. | 280/777 |

* cited by examiner

*Primary Examiner*—Eric Culbreth
*Assistant Examiner*—Barry Gooden, Jr.
(74) *Attorney, Agent, or Firm*—Thomas N. Twoney

(57) ABSTRACT

The invention provides an energy absorbing apparatus for a steering column. The energy absorbing apparatus includes a first member having a telescoping end and a side wall. The energy absorbing apparatus also includes a second member having a telescoping end and a side wall. The second member is disposed for collapsing telescoping movement with the first member. The energy absorbing apparatus also includes a bushing extending annularly between the first member and the second member. The bushing is fixed to one of the first member and the second member. The energy absorbing apparatus also includes at least one projection integrally formed with the bushing and extending longitudinally and radially along the side wall of the one of the first member and the second member. The at least one projection is spaced from the telescoping end of the other of the first member and the second member for being sheared by the telescoping end of the other of the first member and the second member during the collapsing telescoping movement.

16 Claims, 3 Drawing Sheets

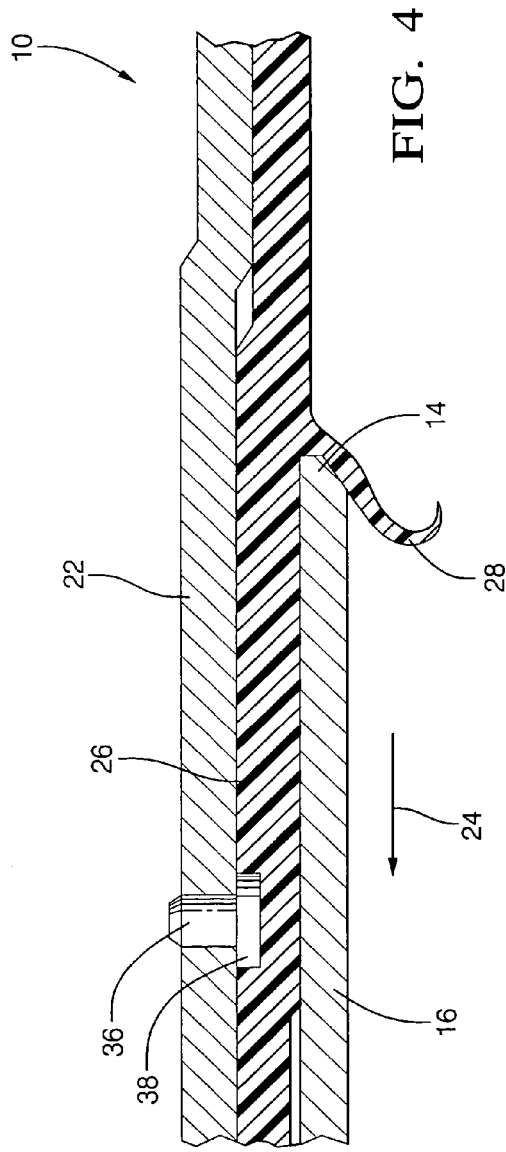
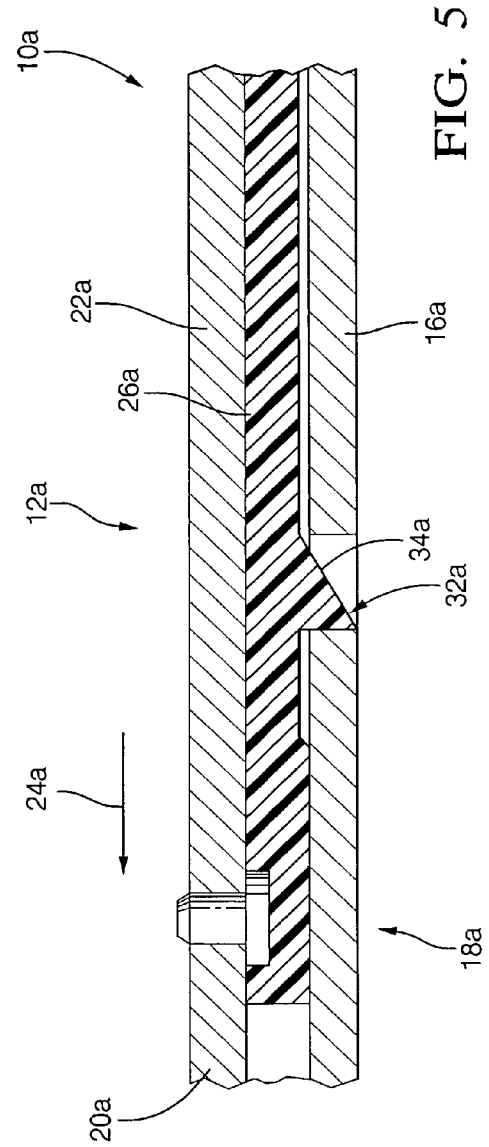

ENERGY ABSORBING APPARATUS

FIELD OF THE INVENTION

The invention relates to steering columns and more particularly to an energy absorbing apparatus for absorbing energy during the telescopic collapse of a steering column.

BACKGROUND OF THE INVENTION

Steering column assemblies for vehicles often include kinetic energy absorption devices that act to control the collapse of the column in the event of a crash to reduce the likelihood of injury to the driver. One form of an energy absorbing device comprises a metal strap that is bent and drawn over an anvil to absorb kinetic energy of a collapsing column. Energy absorbing devices for steering columns can also take the form of one or more bendable projections in a jacket of the column, such as shown in U.S. Pat. No. 5,476,284.

SUMMARY OF THE INVENTION AND ADVANTAGES

The invention provides an energy absorbing apparatus for a steering column. The energy absorbing apparatus includes a first member having a telescoping end and a side wall. The energy absorbing apparatus also includes a second member having a telescoping end and a side wall. The second member is disposed for collapsing telescoping movement with the first member. The energy absorbing apparatus also includes a bushing extending annularly between the first member and the second member. The bushing is fixed to one of the first member and the second member. The energy absorbing apparatus also includes at least one projection integrally formed with the bushing and extending longitudinally and radially along the side wall of the one of the first member and the second member. The at least one projection is spaced from the telescoping end of the other of the first member and the second member for being sheared by the telescoping end of the other of the first member and the second member during the collapsing telescoping movement.

BRIEF DESCRIPTION OF THE DRAWINGS

Advantages of the present invention will be readily appreciated as the same becomes better understood by reference to the following detailed description when considered in connection with the accompanying drawings wherein:

FIG. 4 is a detail view showing a projection of the exemplary embodiment of the invention being sheared from a bushing during telescopic collapse; and FIG. 5 is a detail view of a feature associated with a second exemplary embodiment of the invention for locking steering column members together during normal vehicle handling.

DETAILED DESCRIPTION OF THE PREFERRED EMBODIMENT

Figure 1:
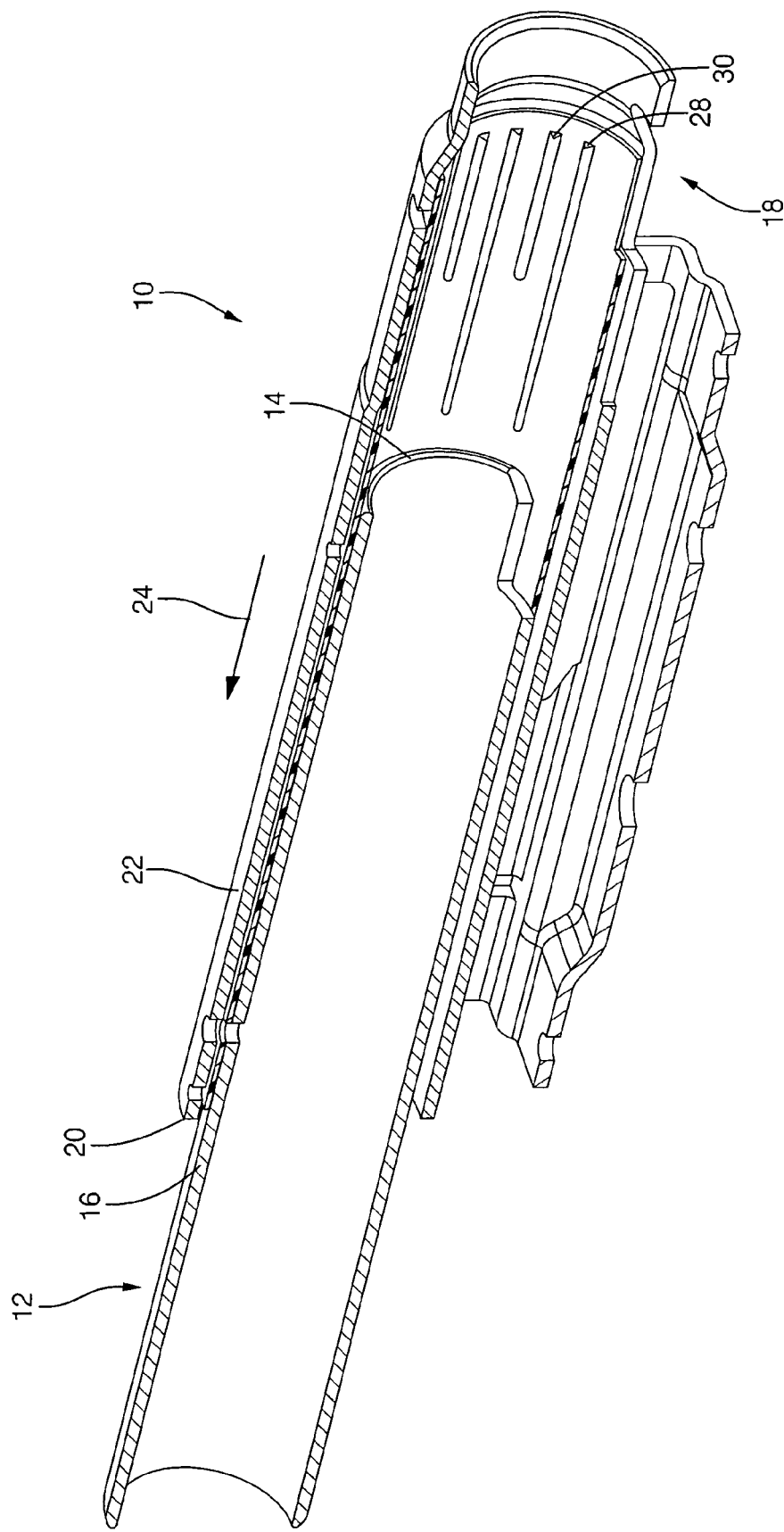
FIG. 1 is a perspective view of a longitudinal cross-section of the exemplary embodiment of the invention.

A plurality of different embodiments of the invention are shown in the Figures of the application. Similar features are shown in the various embodiments of the invention. Similar features have been numbered with a common reference numeral and have been differentiated by an alphabetic designation. Also, to enhance consistency, features in any particular drawing share the same alphabetic designation even if the feature is shown in less than all embodiments. Similar features are structured similarly, operate similarly, and/or have the same function unless otherwise indicated by the drawings or this specification. Furthermore, particular features of one embodiment can replace corresponding features in another embodiment unless otherwise indicated by the drawings or this specification.

Figure 2:
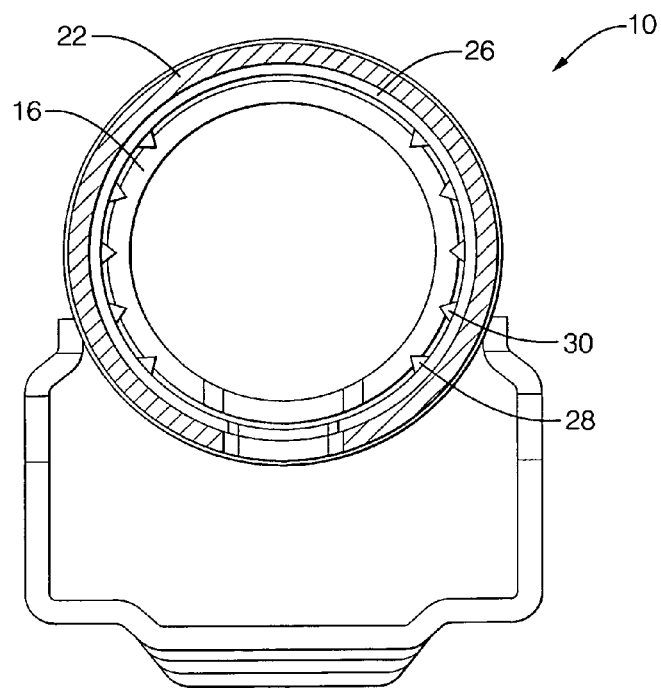
FIG. 2 is a left hand view looking down a longitudinal axis of the exemplary embodiment of the invention.
Figure 3:
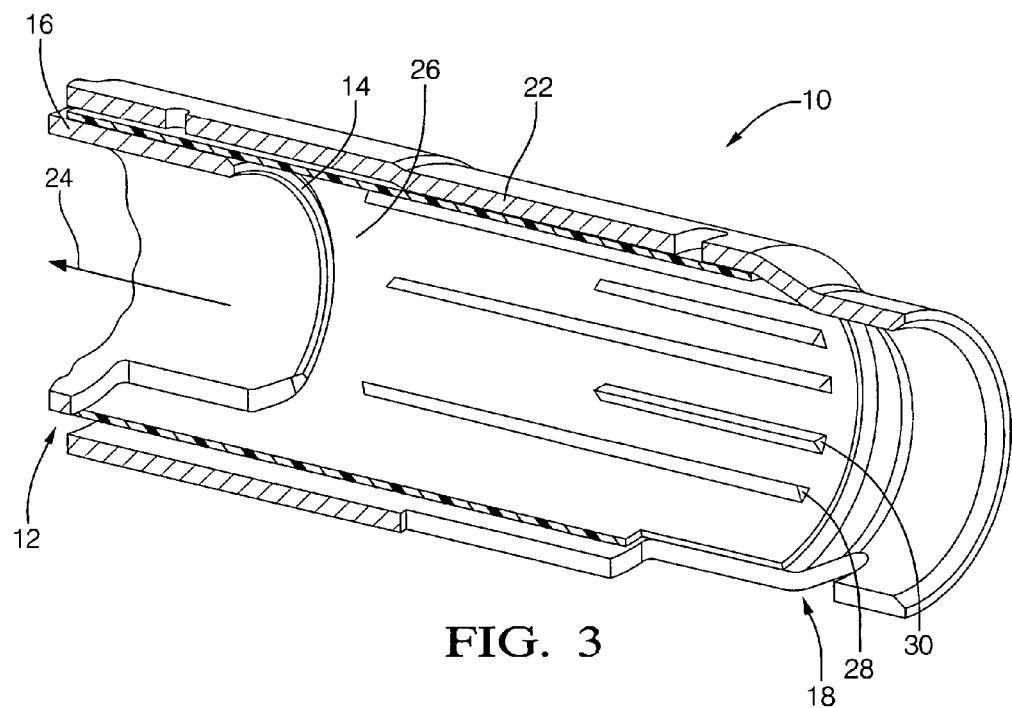
FIG. 3 is a close-up view of a portion of the exemplary embodiment of the invention shown in FIG. 1.

Referring now to FIGS. 1-4, an energy absorbing apparatus 10 for a steering column includes a first member 12 having a telescoping end 14 and a side wall 16. The energy absorbing apparatus 10 also includes a second member 18 having a telescoping end 20 and a side wall 22. The first member 12 and the second member 18 are disposed for collapsing telescoping movement 24 relative to one another. In the first exemplary embodiment of the invention, the second member 18 is an upper steering column jacket and can move in the direction 24 in response to an impact situation where a driver is thrust against a steering wheel of the vehicle. Movement 24 occurs along the centered, longitudinal axis of the first member 12 and the second member 18, which are aligned.

The energy absorbing apparatus 10 also includes a bushing 26 extending annularly between the first member 12 and the second member 18. The bushing 26 is fixed to one of the first member 12 and the second member 18. In the first exemplary embodiment of the invention, the bushing is fixed to the second member 18. In alternative embodiments of the invention, the bushing 26 could be fixed to the first member 12. The energy absorbing apparatus 10 also includes at least one projection, such as projections 28, 30, integrally formed with the bushing 26. The projection 28, 30 extends longitudinally and radially along the side wall 22 of the second member 18. As shown best in FIG. 2, the projections 28, 30 extend radially inward toward the longitudinal center axis of the first member 12 and second member 18. In alternative embodiments of the invention, if the bushing 26 is fixed to the first member 12, the projection 28, 30 would extend longitudinally and radially along the side wall 16 of the first member 12.

The projection 28, 30 is spaced from the telescoping end 14 of the first member 12. In alternative embodiments of the invention, if the bushing 26 is fixed to the first member 12, the projection 28, 30 would be spaced from the telescoping end 20 of the second member 18. In operation, the first member 12 and the second member 18 are substantially fixed relative to one another during normal vehicle handling. When collapsing movement 24 occurs, the projection 28, 30 moves with the second member 18, toward the telescoping end 14. The telescoping end 14 will shear or shave the projection 28, 30 from the bushing 26 to dissipate or absorb energy. In alternative embodiments of the invention, if the bushing 26 is fixed to the first member 12, telescoping end 20 will shear or shave the projection 28, 30 from the bushing 26 to dissipate or absorb energy.

In the exemplary embodiment of the invention, the telescoping end 14 is operable to separate the at least one projection 28, 30 from the bushing 26 during the collapsing telescoping movement 24. As the exemplary embodiment includes a plurality of projections 28, 30 disposed annularly about the bushing 26, 26a, the telescoping end 14 can separate all of the projections 28, 30 from the bushing 26 if the telescoping end 14 travels the lengths of the projections 28, 30. The plurality of projections 28, 30 can be different from one another in at least one of height from the bushing 26, length along the side wall 22 of the second member 18, and width along the bushing 26. The height, length, and/or width can be varied to tune or adjust energy absorption.

In the exemplary embodiment of the invention, the at least one projection 28, 30 is formed from a first material and the telescoping end 14 of the first member 12 is formed from a second material. The second material is harder than the first material. For example, the at least one projection 28, 30 is formed from plastic and the first member 12, 12a is formed from metal.

As best seen in FIG. 4, the first member 12 and second member 18 can be relatively fixedly engaged prior to collapsing telescoping movement 24. The second member 18 includes an aperture 36 extending transverse to the side wall 22. The bushing 26 of the exemplary embodiment includes a cavity 38 facing the side wall 22 and communicating with the aperture 36. Molten plastic can be injected in the aperture 36 and cavity 38. The plastic can harden to form a connection member 40 extending in the aperture 36 and the cavity 38 and formed in situ.

In the exemplary embodiment of the invention, the side wall 16 of the first member 12 is of a substantially constant diameter. Also, the bushing 26 has a substantially constant inner diameter. The inner diameter of the bushing 26 is substantially the same as the outer diameter of the side wall 16. As a result, the bushing 26 can enhance sliding movement of the second member 18 relative to the first member 12 during collapsing telescoping movement 24 by substantially reducing the likelihood of binding.

Referring now to FIG. 5, an energy absorbing apparatus 10a for a steering column includes a first member 12a having a telescoping end (not visible) and a side wall 16a. The energy absorbing apparatus 10a also includes a second member 18a having a telescoping end 20a and a side wall 22a. The first member 12a and the second member 18a are disposed for collapsing telescoping movement 24a relative to one another. In the second exemplary embodiment of the invention, the second member 18a is an upper steering column jacket and can move in the direction 24a in response to an impact situation where a driver is thrust against a steering wheel of the vehicle. Movement 24a occurs along the centered, longitudinal axis of the first member 12a and the second member 18a, which are aligned.

The energy absorbing apparatus 10a also includes a bushing 26a extending annularly between the first member 12a and the second member 18a. The bushing 26a is fixed to one of the first member 12a and the second member 18a. In the first exemplary embodiment of the invention, the bushing is fixed to the second member 18a. In alternative embodiments of the invention, the bushing 26a could be fixed to the first member 12a. The energy absorbing apparatus 10a also includes at least one projection (not shown) integrally formed with the bushing 26a. The energy absorbing apparatus 10a includes a locking tab 32a integrally formed with the bushing 26a. The locking tab 32a extends radially towards the first member 12a. The first member 12a includes a slot 34a receiving the locking tab 32a. The cooperation between the slot 34a and the locking tab 32a substantially prevents movement between the first member 12a and the second member 18a up to a predetermined level of force, such as during normal vehicle handling. The locking tab 32a separates from the bushing 26a in response to a force acting on the second member 18a greater than the predetermined level, such as in an impact situation. Separation or shearing of the locking tab 32a dissipates energy.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An energy absorbing apparatus for a steering column comprising:
   a first member having a telescoping end and a side wall;
   a second member having a telescoping end and a side wall and being disposed for collapsing telescoping movement with said first member;
   a bushing extending annularly between said first member and said second member and fixed to one of said first member and said second member;
   at least one projection integrally formed with said bushing and extending longitudinally and radially along said side wall of said one of said first member and said second member and spaced from said telescoping end of the other of said first member and said second member for being sheared by said telescoping end of said other of said first member and said second member during said collapsing telescoping movement; and
   wherein said telescoping end of said other of said first member and said second member is further defined as being operable to at least partially separate said at least one projection from said bushing during said collapsing telescoping movement.

2. The energy absorbing apparatus of claim 1 wherein said at least one projection further comprises:
   a plurality of projections disposed annularly about said bushing.

3. The energy absorbing apparatus of claim 2 wherein said plurality of projections is further defined as including projections different from one another in at least one of height from said bushing, length along said side wall of said one of said first member and said second member, and width along said bushing.

4. The energy absorbing apparatus of claim 1 further comprising:
   a locking tab integrally formed with said bushing and extending radially toward said other of said first member and said second member.

5. The energy absorbing apparatus of claim 4 wherein said other of said first member and said second member further comprises:
   a slot receiving said locking tab wherein cooperation between said slot and said locking tab substantially prevents movement between said first member and said second member up to a predetermined level of force and wherein said locking tab separates from said bushing in response to a force acting on one of said first member and said second member greater than the predetermined level.

6. The energy absorbing apparatus of claim 1 wherein
   said one of said first member and said second member further comprises an aperture extending transverse to said side wall; and
   said bushing further comprises a cavity facing said side wall of said one of said first member and said second member and communicating with said aperture.

7. The energy absorbing apparatus of claim 6 further comprising:
a connection member extending in said aperture and said cavity and formed in situ.

8. The energy absorbing apparatus of claim 1 wherein said at least one projection is further defined as being formed from a first material and said telescoping end of said other of said first member and said second member is further defined as being formed from a second material harder than said first material.

9. The energy absorbing apparatus of claim 1 wherein said inner side wall of said other of said first member and said second member is of a substantially constant diameter.

10. An energy absorbing apparatus for a steering column comprising:
a first member having an inner telescoping end and an inner side wall;
a second member having an outer telescoping end and an outer side wall and being disposed for collapsing telescoping movement with said first member;
a bushing extending annularly between said first member and said second member and fixed to said second member;
at least one projection integrally formed with said bushing and extending longitudinally and radially along said side wall of said second member and spaced from said inner telescoping end of said first member for being sheared by said inner telescoping end during said collapsing telescoping movement; and
wherein said inner telescoping end of said first member is further defined as being operable to shave said at least one projection from said bushing during said collapsing telescoping movement.

11. The energy absorbing apparatus of claim 10 wherein said bushing is further defined as having a substantially constant inner diameter and said first member is further defined as having a substantially constant outer diameter, wherein said inner diameter and said outer diameter are substantially the same.

12. The energy absorbing apparatus of claim 10 wherein said at least one projection is formed from plastic.

13. The energy absorbing apparatus of claim 12 wherein said first member is formed from metal.

14. A method for absorbing energy associated with telescopic collapse of a steering column comprising the steps of:
telescopically engaging a first member having a telescoping end and a side wall with a second member having a telescoping end and a side wall;
extending a bushing annularly between the first member and the second member;
fixing the bushing to one of the first member and the second member;
integrally forming at least one projection with the bushing extending longitudinally and radially along the side wall of the one of the first member and the second member and spaced from the telescoping end of the other of the first member and the second member for being sheared by the telescoping end of the other of the first member and the second member; and
at least partially separating the at least one projection from the bushing during collapsing telescoping movement between the first member and the second member to absorb energy.

15. The method of claim 14 further comprising the steps of:
forming the at least one projection from a first material; and
forming the telescoping end of the other of the first member and the second member from a second material harder than said first material.

16. The method of claim 14 further comprising the step of:
locking the first member and the second member together up to a predetermined level of force with a locking tab formed integral with the bushing and the at least one projection.

* * * * *